US012197330B2

United States Patent
Zhang et al.

(10) Patent No.: US 12,197,330 B2
(45) Date of Patent: Jan. 14, 2025

(54) DATA STORING SYSTEMS, DATA STORING METHODS, AND ELECTRONIC DEVICES

(71) Applicants: ZHEJIANG LAB, Hangzhou (CN); Huazhong University of Science and Technology, Hubei (CN)

(72) Inventors: Zhan Zhang, Hangzhou (CN); Yu Zhang, Hubei (CN); Jin Zhao, Hangzhou (CN); Haifei Wu, Hangzhou (CN)

(73) Assignees: ZHEJIANG LAB, Hangzhou (CN); Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/470,346

(22) Filed: Sep. 19, 2023

(65) Prior Publication Data
US 2024/0311300 A1    Sep. 19, 2024

(30) Foreign Application Priority Data
Mar. 13, 2023  (CN) .......................... 202310259451.6

(51) Int. Cl.
*G06F 12/0804*    (2016.01)
(52) U.S. Cl.
CPC .. *G06F 12/0804* (2013.01); *G06F 2212/1032* (2013.01)

(58) Field of Classification Search
CPC ..................... G06F 12/0804; G06F 2212/1032
See application file for complete search history.

(56) References Cited

U.S. PATENT DOCUMENTS

| | | | |
|---|---|---|---|
| 2007/0073740 A1* | 3/2007 | Kirshenbaum | G06F 9/4488 |
| 2009/0074191 A1* | 3/2009 | Gatto | G06Q 20/12 713/2 |
| 2018/0089468 A1* | 3/2018 | Rozas | G06F 21/78 |
| 2019/0306221 A1* | 10/2019 | Venkivolu | H04L 63/0428 |

* cited by examiner

*Primary Examiner* — Prasith Thammavong
(74) *Attorney, Agent, or Firm* — McCoy Russell LLP

(57) ABSTRACT

The present disclosure provides a data storage system, including data cache module, data processing module, and a persistent memory. The data cache module includes an on-chip mapping data cache and an on-chip counter cache, where the mapping data cache is configured to cache mapping data, and when the free space of the mapping data cache is less than a preset threshold, the least recently used mapping data cache line will be evicted from the cache and written back to the persistent memory. The data processing module encrypts/decrypts persistent memory data by using their counters, and accesses the persistent memory blocks indicated by their corresponding mapping data. The persistent memory comprises the first and second storage regions for the latest checkpoint data and modified working data in the current checkpoint interval respectively.

20 Claims, 5 Drawing Sheets

DATA STORING SYSTEMS, DATA STORING METHODS, AND ELECTRONIC DEVICES

CROSS REFERENCE TO RELATED APPLICATIONS

This application claims priority to Chinese Patent Application No. 202310259451.6 filed on Mar. 13, 2023, the entire content of which is incorporated herein by reference.

TECHNICAL FIELD

The present disclosure relates to the field of computer technology, in particular to data storing systems, data storing methods, and electronic devices.

BACKGROUND

With an explosive growth of data computing scale, a demand for memory capacity in data computing is increasing. Especially in a calculation process of graph data, there is usually a large amount of graph data that needs to be updated, which increases a cost of graph data persistence.

Relevant studies have shown that checkpoint strategy can be used to maintain crash consistency of persistent data. In the checkpoint strategy, a system periodically publishes a checkpoint that includes modified memory data (dirty data), modified cache data, and processor status data. The system writes the checkpoint to a persistent device. A known normal point is set for the system so that the system can recover data modification and processor status from the normal point in a recovery process after an unexpected shutdown or crash, thus ensuring the consistency of persistent data.

SUMMARY

The present disclosure provides a data storing system, a data storing method, and an electronic device to solve at least one part of the aforementioned problem.

The present disclosure adopts following technical solutions.

In the first aspect, a data storing system is provided, and includes: a data cache module, a data processing module, and a persistent memory, where the first storage region and the second storage region are configured to store checkpoint data committed at an end of a previous checkpoint interval and working data modified in a current checkpoint interval, where the checkpoint data is configured for data recovery after a system restart; the data cache module includes a mapping data cache and a counter cache, where the mapping data cache is configured to cache at least a part of mapping data; and in response to determining that a mapping data cache space is less than a preset threshold, remove least recently used mapping data from the mapping data cache, such that the least recently used mapping data is written into the persistent memory; where the mapping data is configured to determine a storage region of the checkpoint data in the persistence memory and a storage region of the working data in the persistence memory, and the counter cache is configured to cache at least part of counter data, where a value of the counter data increases with an update of target data; and the data processing module is configured to obtain, from the counter cache, target counter data corresponding to a write request to the persistent memory; obtain, from the mapping data cache, target mapping data corresponding to the write request; according to the target counter data, encrypt the updated working data to obtain cyphertext; and according to the target mapping data, store the cyphertext in the storage region reserved for the working data, where each working data has its own mapping data.

In some embodiments, the data processing module is further configured to: in response to determining that the target mapping data is not stored in the mapping data cache, obtain the target mapping data from the persistent memory; and after obtaining the write request, determine whether a number of a checkpoint interval corresponding to the target mapping data obtained from the persistent memory is less than a number of the current checkpoint interval, in response to determining that the number of the checkpoint interval corresponding to the target mapping data obtained from the persistent memory is less than the number of the current checkpoint interval, store the cyphertext in a storage region corresponding to checkpoint data indicated by the target mapping data, and take the working data as the checkpoint data, in response to determining that the number of the checkpoint interval corresponding to the target mapping data obtained from the persistent memory is equal to the number of a current checkpoint interval, in response to determining that checkpoint data and working data indicated by the target mapping data are located in a same storage region, store the cyphertext in another storage region than the storage region of the checkpoint data and the working data indicated by the target mapping data, in response to determining that checkpoint data and working data indicated by the target mapping data are located in different storage regions, store the cyphertext in a storage region corresponding to working data indicated by the target mapping data.

In some embodiments, the persistent memory further includes a logging region, a checkpoint metadata storage region, a counter data storage region, and a mapping data storage region, where the logging region is configured to store an undo log for updated counter data.

In some embodiments, the data processing module is configured to: when the checkpoint interval ends, suspend an application process, and write dirty cache lines in a processor cache back to the persistent memory with a process of memory write request, write the dirty cache lines in the mapping data cache and counter cache to the persistent memory, and write the processor status data back to the persistent memory; and increase the number of the current checkpoint interval and release a space of a counter undo log in the persistent memory.

In some embodiments, the data processing module is configured to: after receiving the write request, obtain counter data; according to a cache line tag corresponding to the counter data, determine whether the counter data changes in the current checkpoint interval, in response to determining that the counter data does not change in the current checkpoint interval, write the counter data into the undo log, write the undo log into the logging region in the persistent memory, and update the counter data and the cache line tag; in response to determining that the counter data changes in the current checkpoint interval, update the counter data; and according to updated counter data, encrypt the target data to obtain cyphertext.

In some embodiments, the data cache module further includes a log metadata register and a checkpoint metadata register, where the log metadata register is configured to cache persistent memory addresses of counter data blocks, wherein the number of the addresses cached by the register is less than or equal to a determined threshold; and in response to determining that the number of the cached memory addresses reaches the threshold, write content of the register to the persistent memory with a memory write request, and cache the persistent memory address of the next unused undo log space; and the checkpoint metadata register is configured to store a start address of the mapping data in the persistent memory and the recently used part of the persistent memory space allocation bitmap, and store four flag bits respectively configured to indicate whether dirty processor cache lines, dirty counter cache lines, dirty mapping data cache lines and processor status are written back to the persistent memory during checkpoint committing phase.

In some embodiments, the target mapping data includes a first flag bit and a second flag bit, where the first flag bit is configured to represent whether the checkpoint data is stored in the first storage region or the second storage region, and the second flag bit is configured to represent whether the working data is stored in the first storage region or the second storage region.

In some embodiments, the data processing module is configured to: after receiving the write request, determine whether a number of the checkpoint interval corresponding to the target mapping data is less than a number of the current checkpoint interval, in response to determining that the number of the checkpoint interval corresponding to the target mapping data is less than the number of the current checkpoint interval, set a storage region indicated by the second flag bit in the target mapping data as a storage region indicated by the first flag bit in the target mapping data; update the number of the checkpoint interval corresponding to the target mapping data to the number of the current checkpoint interval; and determine whether the storage region indicated by the first flag bit in the target mapping data corresponding to the write request and the storage region indicated by the second flag bit in the target mapping data corresponding to the write request are same, in response to determining that the storage region indicated by the first flag bit in the target mapping data corresponding to the write request and the storage region indicated by the second flag bit in the target mapping data corresponding to the write request are different, store the cyphertext in the storage region indicated by the second flag bit; in response to determining that the storage region indicated by the first flag bit in the target mapping data corresponding to the write request and the storage region indicated by the second flag bit in the target mapping data corresponding to the write request are same, flip the second flag bit and store the cyphertext in a storage region indicated by the flipped second flag bit.

In some embodiments, the data processing module is further configured to: obtain a read request for the persistent memory; according to a target memory address corresponding to the read request, obtain target counter data and target mapping data corresponding to the read request; according to the target mapping data, determine a storage region in the persistent memory indicated by the second flag bit as a target storage region, and read cyphertext from the target storage region; and according to the target counter data, decrypt the cyphertext to obtain decrypted data corresponding to the read request.

In some embodiments, the data processing module is further configured to: after a system restart, read a undo log of the counter generated in a target checkpoint interval before the system restart from a logging region in the persistent memory; according to the undo log, determine an address of a first storage region in the persistent memory of working data in the target checkpoint interval; according to the address of the first storage region, obtain designated mapping data; determine whether a number of the checkpoint interval corresponding to the designated mapping data is the same as a number of a system checkpoint interval in a checkpoint metadata storage region of the persistent memory, in response to determining that the number of the checkpoint interval corresponding to the designated mapping data is the same as the number of the system checkpoint interval in the checkpoint metadata storage region of the persistent memory, update a value of the second flag bit in the designated mapping data that is different from the first flag bit to a value of the first flag bit; read a number of the checkpoint interval before the system restart from the persistent memory, send the number of the checkpoint interval before the system restart from the persistent memory to the checkpoint metadata register, increase a number of the checkpoint interval, and start data recovery; based on the counter value in the undo log, decrypt the checkpoint data indicated by the first flag bit of the mapping data, re-encrypt the checkpoint plaintext with a new counter value and send the cyphertext to the persistent memory; and flush the modified counter cache lines and mapping data cache lines back to the persistent memory, send the processor status in checkpoint data to the processor registers, increase the number of checkpoint interval, complete data recovery, and continue to execute application.

In some embodiments, the data processing module is configured to: in response to determining that the target counter data is not stored in the counter cache and the target mapping data is not stored in the mapping data cache, obtain the target counter data and the target mapping data from the persistent memory.

In some embodiments, the target data includes graph data, and the data storing system is configured to read and write graph data involved in a graph calculation process.

In the second aspect, a data storing method is provided, applied to a data storing system, where the data storing system includes a data cache module, a data processing module and a persistent memory, and the data cache module includes a counter cache and a mapping data cache; where the method is executed by the data processing module, and includes: obtaining mapping data corresponding to a persistent memory write request from the mapping data cache, and obtaining counter data corresponding to the write request from the counter cache, wherein the persistent memory comprises the first storage region and the second storage region, which are configured to store latest checkpoint data and working data modified in current checkpoint interval, the mapping data is configured to determine which storage region the checkpoint data and modified working data are stored, and in response to determining that the free space of the mapping data cache is less than a preset threshold, least recently used mapping data cache line is written back to the persistent memory from mapping data cache, wherein a counter is increased when its corresponding data block is updated, and the checkpoint data is configured for system recovery, wherein each modified persistent memory data block has its corresponding mapping data; and according to the target counter data, encrypting the target data to obtain cyphertext, and according to the target mapping data, storing the cyphertext in a storage region corresponding to the working data.

In some embodiments, the method further includes: in response to determining that the target mapping data is not stored in the mapping data cache, obtaining the target mapping data from the persistent memory; and after obtaining the write request, determining whether a number of a checkpoint interval corresponding to the target mapping data obtained from the persistent memory is less than a number of the current checkpoint interval, in response to determining that the number of the checkpoint interval corresponding to the target mapping data obtained from the persistent memory is less than the number of the current checkpoint interval, storing the cyphertext in a storage region corresponding to checkpoint data indicated by the target mapping data, and taking the working data as the checkpoint data; in response to determining that the number of the checkpoint interval corresponding to the target mapping data obtained from the persistent memory is equal to the number of the current checkpoint interval, in response to determining that checkpoint data and working data indicated by the target mapping data are located in a same storage region, storing the cyphertext in another storage region than the storage region of the checkpoint data and the working data indicated by the target mapping data, in response to determining that checkpoint data and working data indicated by the target mapping data are located in different storage regions, storing the cyphertext in a storage region corresponding to working data indicated by the target mapping data.

In some embodiments, the persistent memory further includes a logging region, a checkpoint metadata storage region, a counter data storage region, and a mapping data storage region, where the logging region is configured to store an undo log corresponding to the counter data.

In some embodiments, the method further includes: when the checkpoint interval ends, suspending an application process, writing dirty cache lines in the processor cache back to the persistent memory according to a normal process of memory write request, and writing dirty cache lines in the mapping data cache, dirty cache lines in the counter cache and processor status data back to the persistent memory as checkpoint data; and increasing the number of the current checkpoint interval and releasing the space of the counter undo log in the persistent memory.

In some embodiments, according to the target counter data, encrypting the target data to obtain cyphertext includes: after receiving the write request, obtaining counter data; according to a cache line tag corresponding to the counter data, determining whether the counter data changes in the current checkpoint interval, in response to determining that the counter data does not change in the current checkpoint interval, writing the counter data into the undo log, writing the undo log into the logging region in the persistent memory, and updating the counter data and the cache line tag; in response to determining that the counter data changes in the current checkpoint interval, updating the counter data; and according to updated counter data, encrypting the target data to obtain cyphertext.

In some embodiments, the data cache module further includes a log metadata register and a checkpoint metadata register, where the log metadata register is configured to cache persistent memory addresses of counter data blocks, wherein the number of the addresses cached by the register is less than or equal to a determined threshold; and in response to determining that the number of the cached memory addresses reaches the threshold, write content of the register to the persistent memory with a memory write request; and cache the persistent memory address of the next unused undo log space; and the checkpoint metadata register is configured to store a start address of the mapping data in the persistent memory and the recently used part of the persistent memory space allocation bitmap, and store four flag bits respectively configured to indicate whether dirty processor cache lines, dirty counter cache lines, dirty mapping data cache lines and processor status are written back to the persistent memory during checkpoint committing phase.

In some embodiments, the target mapping data includes a first flag bit and a second flag bit, where the first flag bit is configured to represent whether the checkpoint data is stored in the first storage region or the second storage region, and the second flag bit is configured to represent whether the working data is stored in the first storage region or the second storage region.

In some embodiments, the method further includes: after receiving the write request, determining whether a number of the checkpoint interval corresponding to the target mapping data is less than a number of the current checkpoint interval; in response to determining that the number of the checkpoint interval corresponding to the target mapping data is less than the number of the current checkpoint interval, setting a storage region indicated by the second flag bit in the target mapping data as a storage region indicated by the first flag bit in the target mapping data; updating the number of the checkpoint interval corresponding to the target mapping data to the number of the current checkpoint interval; and determining whether the storage region indicated by the first flag bit in the target mapping data corresponding to the write request and the storage region indicated by the second flag bit in the target mapping data corresponding to the write request are same; in response to determining that the storage region indicated by the first flag bit in the target mapping data corresponding to the write request and the storage region indicated by the second flag bit in the target mapping data corresponding to the write request are different, storing the cyphertext in the storage region indicated by the second flag bit; in response to determining that the storage region indicated by the first flag bit in the target mapping data corresponding to the write request and the storage region indicated by the second flag bit in the target mapping data corresponding to the write request are same, flipping the second flag bit and storing the cyphertext in a storage region indicated by the flipped second flag bit.

In some embodiments, the method further includes: obtaining a read request for the persistent memory; according to a target memory address corresponding to the read request, obtaining target counter data and target mapping data corresponding to the read request; according to the target mapping data, determining a storage region in the persistent memory indicated by the second flag bit as a target storage region, and reading cyphertext from the target storage region; and according to the target counter data, decrypting the cyphertext to obtain decrypted data corresponding to the read request.

In some embodiments, the method further includes: after a system restart, reading a undo log of the counter generated in a target checkpoint interval before the system restart from a logging region in the persistent memory; according to the undo log, determining an address of a first storage region in the persistent memory of working data in the target checkpoint interval; according to the address of the first storage region, obtaining designated mapping data, determining whether a number of the checkpoint interval corresponding to the designated mapping data is the same as a number of a system checkpoint interval in a checkpoint metadata storage region of the persistent memory; in response to determining that the number of the checkpoint interval corresponding to the designated mapping data is the same as the number of the system checkpoint interval in the checkpoint metadata storage region of the persistent memory, updating a value of the second flag bit in the designated mapping data that is different from the first flag bit to a value of the first flag bit; reading a number of the checkpoint interval before the system restart from the persistent memory, sending the number of the checkpoint interval before the system restart from the persistent memory to the checkpoint metadata register, increasing a number of the checkpoint interval, and starting data recovery; based on the counter value in the undo log, decrypting the checkpoint data indicated by the first flag bit of the mapping data, re-encrypting the checkpoint plaintext with a new counter value and sending the cyphertext to the persistent memory; and writing the modified counter cache lines and mapping data cache lines back to the persistent memory, sending the processor status in the checkpoint data to the processor registers, increasing the number of checkpoint interval, completing data recovery, and continuing to execute application.

In some embodiments, according to the target counter data, encrypting the target data to obtain cyphertext, and according to the target mapping data, storing the cyphertext in the storage region corresponding to the working data includes: in response to determining that the target counter data is not stored in the counter cache and the target mapping data is not stored in the mapping data cache, accessing the persistent memory, and obtaining the target counter data and the target mapping data from the persistent memory.

In some embodiments, the target data includes graph data, and the data storing system is configured to read and write graph data involved in a graph calculation process.

In the third aspect, an electronic device is provided, and includes a memory, a processor and a computer program stored on the memory and runnable on the processor, where the processor, when the program is executed by the processor, achieves the data storing method according to any one of the embodiments mentioned above.

BRIEF DESCRIPTION OF DRAWINGS

The accompanying drawings illustrated herein are used to provide further understanding of the present disclosure and form a part of the present disclosure. The exemplary embodiments and descriptions of the present disclosure are used to explain the present disclosure, and do not constitute an improper limitation of the present disclosure.

DETAILED DESCRIPTION

Figures 1, 2:
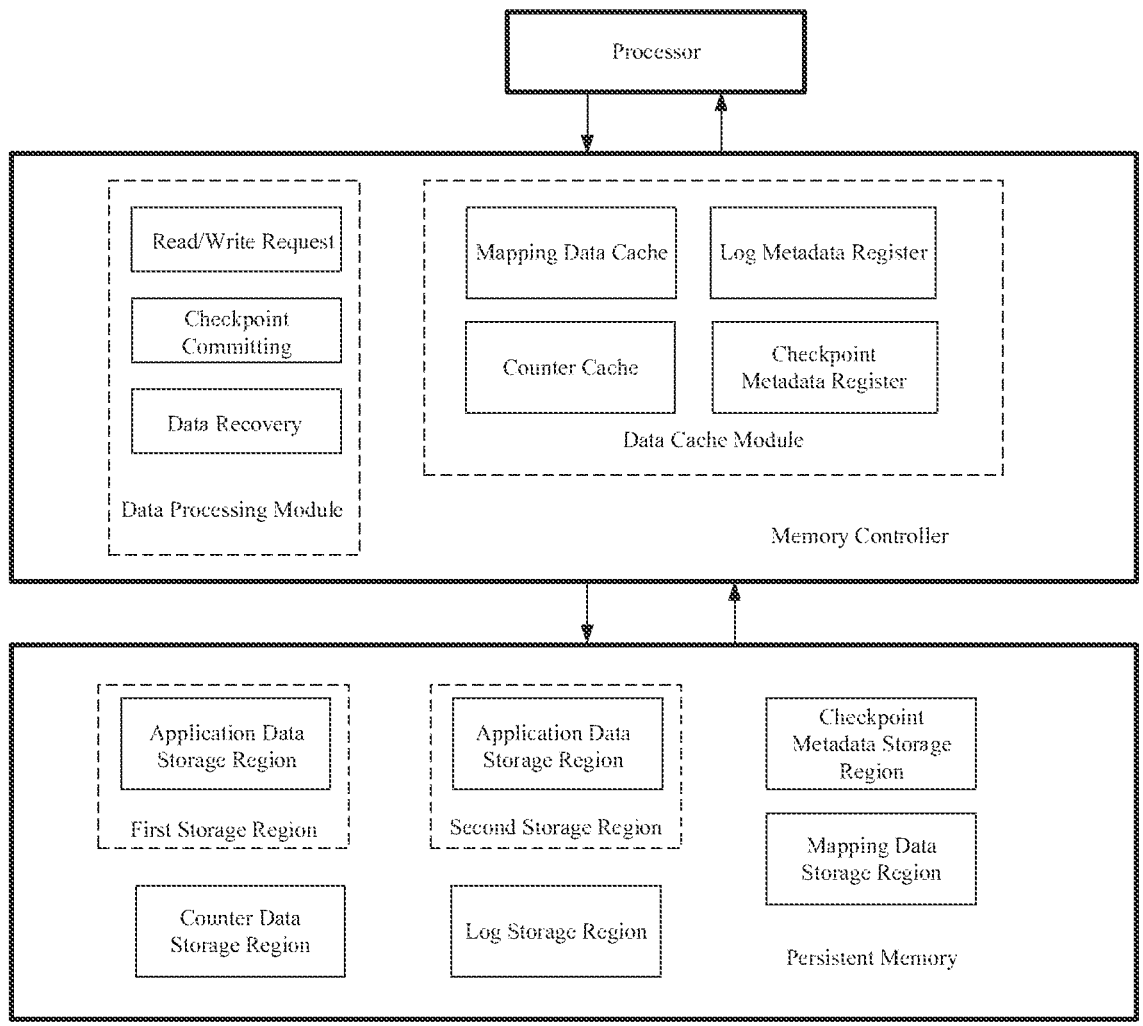
FIG. 1 is a schematic diagram of a data storing system provided in the present disclosure.
FIG. 2 is a structural schematic diagram of mapping data provided in the present disclosure.

In order present the purposes, technical solutions and advantages of the present disclosure clearer, the technical solutions of the present disclosure will be clearly and completely described below in conjunction with specific embodiments and corresponding drawings of the present disclosure. The described embodiments are only a part of the embodiments of the present disclosure, and not all of them. Other embodiments achieved by those skilled in the art based on the embodiments in the present disclosure without paying creative work shall all fall within the scope of protection of the present disclosure.

In practical applications, a way to achieve checkpoints is to configure a shadow memory corresponding to a target memory in the persistent memory. The target memory and shadow memory rotate to store checkpoint data committed after reaching a checkpoint and updated working data during execution period, avoiding valid checkpoint data from being modified causing failure. The target memory and the shadow memory may be referred to as the first storage region and the second storage region respectively. At the same time, mapping data is used to indicate a location of the working data and the checkpoint data.

However, in a process of writing data, each time a write request is received, a piece of mapping data indicating working data and checkpoint data location needs to be sent into mapping data cache in memory controller. As the mapping data increases, the cache space may be run out before the end of checkpoint interval, which causes early checkpoint committing to reclaim cache space. These redundant committing operations will further increase the system checkpointing overhead.

Therefore, how to reduce limitation of a system cache space on mapping data is an urgent problem to be solved.

Relevant studies only use shadow memory checkpoints to implement persistent memory systems. When designing efficient encrypted persistent memory systems based on shadow memory checkpoints for graph computing, the following challenges need to be addressed.

First, consistency of counter data needs to be maintained. A commonly-used method for encrypting memory data in relevant technologies is a counter-based data encryption strategy. When the memory data changes, a count in a counter is also increased accordingly. The same counter as the counter used for encryption is required for data decryption. In addition, in order to speed up the encryption and decryption of memory data, the counter is cached in a volatile cache of a memory controller. If the system is powered off, the cache data will be lost. Therefore, an encrypted persistent memory system for graph computing needs to maintain data consistency not only between graph data, but also between graph data and corresponding counter data, making data consistency maintenance more difficult.

Second, submission operations for redundant checkpoints need to be avoided. A shadow memory checkpoint system in relevant technologies needs to save mapping data in a mapping data cache. When an on-chip cache space is insufficient, a checkpoint committing operation needs to be performed in advance, program process needs to be suspended, and data in the first and second storage regions needs to be merged, to reclaim the mapping data cache space. These additional checkpoint committing operations located on a critical path for system execution increase the amount of data accessed in the persistent memory and increase a memory access cost of the system. In an encrypted memory, these additional memory access operations further increase an encryption cost of the system and further reduce the performance of the system.

The technical solutions provided in the embodiments of the present disclosure are described in detail below in conjunction with the accompanying drawings.

FIG. 1 is a schematic diagram of a data storing system provided in the present disclosure. The data storing system includes a memory controller and a persistent memory. The memory controller contains a data cache module and a data processing module (such as the central processing unit, CPU). The data cache module is configured to cache metadata required for setting memory checkpoints, generating undo log, satisfying memory request, and encrypting memory data. The data processing module is configured to execute a read/write request for data, implement operational logic required to maintain data crash consistency and data recovery. The operational logic corresponds to a method for maintaining the memory data crash consistency.

The data storing system in the present disclosure is composed of a data cache module, a persistent memory, and a data processing module.

In the present disclosure, the data storing system can be applied to a scenario of graph data calculation to read and write the graph data involved in the calculation process of graph data. Of course, the data storing system can also be applied to scenarios for calculation of other types of data, which is not limited in the present disclosure.

In practical applications, a processor executing an application program (such as an application program for graph data) can send a data read/write request to a memory controller, and the memory controller can read data from or write data into the persistent memory, and then feedback a result to a processor cache of the processor.

Furthermore, the data cache module can include: a mapping data cache, a counter cache, a log metadata register, and a checkpoint metadata register.

The mapping data cache stores mapping data. The mapping data is configured to determine storage regions in the persistent memory of checkpoint data and working data, that is, to determine whether the working data or the checkpoint data is in an original memory page (a page where a destination address of the memory read/write request is) of a first storage region or a shadow memory page of a second storage region, where mapping data corresponding to two adjacent original memory pages (with a size of 4 KB) is stored in a cache line with a size of 64 B in the mapping data cache.

In practical applications, checkpoints are usually set to achieve data recovery after power outage and restart. At the end of a checkpoint interval, we write the modified data in working memory, on-chip data cache module and processor registers back to persistent memory composed as a committed checkpointing data. In this way, the crashed system can be recovered by the latest checkpointing data, ensuring the system data crash consistency. The submission operation of the checkpoint data is described in detail below, which is not repeated here.

If there is a loss of data in the mapping data cache during a power outage, the mapped data cache can use a mapping data memory address corresponding to the original memory page in the first storage region as an index to cache the hotter mapping data in the persistent memory.

In the present disclosure, each mapping data can be sorted based on the access time of the mapping data. The mapping data sorted after a preset position can be regarded as colder mapping data, and the mapping data sorted before a preset position can be regarded as hotter mapping data. The above preset positions can be set according to the actual situation, which is not limited in the present disclosure.

In addition, each cache line in the mapping data cache is set with a flag bit to determine whether mapping data in each cache line is modified. The modified mapping data is written back to the persistent memory after being removed from the mapping data cache, without the need to save all mapping data in the mapping data cache. A mapping data cache capacity can be set according to a capacity of the persistent memory.

For example, in an execution process of an application, a mapping data cache space less than a preset threshold indicating that a current mapping data cache space is insufficient to store next mapping data. In this case, the mapping data cache can remove least recently used mapping data from the cache, such that the least recently used mapping data is written into the persistent memory. The preset threshold can be set according to an actual situation, which is not limited in the present disclosure.

A structure of the mapping data is shown in FIG. 2.

FIG. 2 is a structural schematic diagram of mapping data provided in the present disclosure.

The number of the checkpoint interval is stored in 64 bits space, it stores the value of checkpoint interval when mapping data is modified. In the present disclosure, a memory page corresponding to the second storage region can be regarded as a shadow memory page. A size of an address of the shadow memory page can be 64 bits, where the page size can be 4 KB, including 64 number of 64 B data blocks. A size of the data block is the same as a data volume of a memory access request (such as a read request or a write request). For an original memory page that have not been modified in the first storage region, a shadow memory page is not allocated, and a corresponding address of a shadow memory page is 0.

A size of a first flag bitmap is 64 bits. The first flag bitmap represents a storage location of checkpoint data. Each flag bit in the first flag bitmap corresponds to a 64 B data block in a logical page. A flag bit of 0 indicates that checkpoint data corresponding to a data block corresponding to the flag bit is saved on the original memory page of the first storage region, and a flag bit of 1 indicates that checkpoint data corresponding to a data block corresponding to the flag bit is saved on the shadow memory page of the second storage region.

A size of a second flag bitmap is 64 bits. The second flag bitmap represents a storage location of working data. Each flag bit in the second flag bitmap corresponds to a 64 B data block in a logical page. A flag bit of 0 indicates that working data corresponding to a data block corresponding to the flag bit is saved on the original memory page of the first storage region, and a flag bit of 1 indicates that working data corresponding to a data block corresponding to the flag bit is saved on the shadow memory page of the second storage region.

Of course, in the present disclosure, a memory page corresponding to the first storage region can also be used as a shadow memory page, and a memory page corresponding to the second storage region can be used as an original memory page.

Counter data corresponding to a target data is cached in a cache line of the counter cache.

The counter cache using a counter data storage address corresponding to an original memory page as an index, caches counter data located in a counter data storage region in the persistent memory. A value of the counter data increases as the target data is updated. A capacity of the counter cache can be set according to a capacity of the mapping data cache, so that the number of mapping data stored in the mapping data cache is greater than or equal to the number of counter data stored in the counter cache, ensuring that in most cases, if the counter cache hits, the mapping data cache also hits.

It should be noted that each 64 B data block in the original memory page is a piece of target data. For each data block, the data block shares the same counter with the corresponding data block in the shadow memory page. Regardless of whether a data block stored in the original memory page or the shadow memory page is updated, the counter value increases.

The log metadata register can store the persistent memory address of a counter data block, where the number of the stored addresses is less than or equal to a designated threshold; and in response to determining that the number of the stored addresses reaches the designated threshold, send the stored address to the persistent memory through a memory write request.

In the present disclosure, the counter undo log includes log headers and log entries. An undo log entry stores the original value of a modified 64 B counter data block. A log header is 64 B and can store up to eight persistent memory addresses of the modified counter data blocks, which are associated with eight contiguous counter undo log entries. The current log header block is stored in the log metadata register.

Therefore, the designated number can be set to 8, that is, when a register for a log header is filled up with 8 counter data block addresses or no new log entries arrive, the log header is written back to the persistent memory. When a power outage occurs, the on-flight log header is written back to persistent memory supported by Asynchronous DRAM Refresh (ADR).

In addition, the log metadata register caches the next free log space address of the logging region in persistent memory. The free space address updates with writing of log data. When a power outage occurs, the next free log space address in metadata register will be flushed to persistent memory supported by ADR and used to identify the scope of counter undo log during system recover process.

The checkpoint metadata register caches a start address of the mapping data in the persistent memory. The system can calculate the storage address of the mapping data corresponding to the read/write request based on the target memory address corresponding to the memory read/write request and the start address of the mapping data.

The checkpoint metadata register caches the start address of the mapping data in the persistent memory and a designated part of the memory space allocation bitmap. The designated part can be a hotter part of the shadow memory space allocation bitmap. Each bit in the bitmap represents whether the corresponding shadow memory page has been allocated. The modified bitmap data is written back to a checkpoint metadata region in the persistent memory. When a power outage occurs, the shadow memory page allocation bitmap is written back to the persistent memory by using ADR.

Four flag bits are further cached in the checkpoint metadata register to mark whether dirty data (that is, the modified data) in the processor cache, dirty data in the counter cache, dirty data in the mapping data cache, and the processor status data are flushed to the persistent memory in the checkpoint committing phase. A location to which the processor status data should be refreshed in the persistent memory is the checkpoint metadata storage region.

The persistent memory contains multiple storage regions, including a first storage region, a second storage region, a logging region, a checkpoint metadata storage region, a counter data storage region, and a mapping data storage region. The first storage region and the second storage region are used to store checkpoint data committed at the end of a checkpoint interval and working data modified in a current checkpoint interval. The checkpoint metadata storage region is used to store the processor status data committed at the end of a checkpoint interval and metadata required for checkpoint management. The counter data storage region is used to store the counter data removed from the counter cache. The mapping data storage region is used to store the mapping data removed from the mapping data cache.

In addition, the first storage region and the second storage region can further be respectively set with application data storage regions. The application data storage regions are used to store the application data required in the data reading and writing process.

The data processing module includes a data read/write request processing module, a checkpoint committing module and a data recovery module, which respectively execute the memory read/write request processing method, checkpoint committing method and system data recovery method in the memory controller.

When the memory controller receives a memory read/write request, the system will read the on-chip counter cache and mapping data cache simultaneously. If a cache miss happens, it will access the persistent memory for the missing counter or mapping data, and insert data to the corresponding cache.

After the read/write request processing module of the persistent memory obtains the target counter data, if a dirty data flag bit of a corresponding counter cache line is not set (that is, the counter data corresponding to the cache is not modified, and the value of the flag bit is 0), the read/write request processing module can write the target counter data cache line into the undo log before the counter value is modified. The system determines an available logging region address based on the log metadata register, writes counter data in an original counter cache line back into the logging region in persistent memory as a log entry, and sends a memory address of the counter cache line to a log header in the log metadata register. Then, the read/write request processing module updates the counter value and the counter cache line tag. If the 16th bit of the updated counter value changes, the whole counter cache line will be written back to the persistent memory from the counter cache.

After the counter value is updated, the read/write request processing module can calculate the one-time pad (OTP) required for encryption based on the updated counter data, and then XOR the OTP and plaintext of the target data that is currently written to obtain ciphertext, thereby completing the encryption of the target data and obtaining cyphertext.

Since colder mapping data is removed from the mapping data cache to the persistent memory during a data access process, when target mapping data can be directly obtained from the mapping data cache, the read/write request processing module can directly determine a storage region of the working data based on the target mapping data. If the target mapping data needs to be obtained from the persistent memory, it indicates that the target mapping data has been removed from the mapping data cache and may not have been updated for a long time, and in this case, the checkpoint data in the checkpoint data storage region indicated by the target mapping data may have expired.

Therefore, in order to ensure that valid checkpoint data is not overwritten by the written working data, the read/write request processing module can compare the number of a current checkpoint interval of the system in the checkpoint metadata register with the number of the checkpoint interval in the target mapping data corresponding to the write request, and update the target mapping data.

For example, if the number of the current checkpoint interval of the system is greater than the number of the checkpoint interval in the target mapping data, it indicates that the latest update to graph data corresponding to the target mapping data occurred within a previously successfully committed checkpoint interval. In this case, the read/write request processing module can set a value of a first flag bit in the target mapping data to a value of a second flag bit, and set the number of the checkpoint interval of the target mapping data to the number of the current checkpoint interval of the system.

If the number of the checkpoint interval in the target mapping data is equal to the number of the current checkpoint interval of the system, the uncommitted modification to target working data indicated by the second flag bit of the target mapping data occurs within the current checkpoint interval, and there is no need to update the target mapping data in this case.

After the cyphertext is obtained and the update to the target mapping data is completed, the read/write request processing module can read the first and second flag bits corresponding to the write request memory address from the target mapping data. If the two flag bits have the same value, it indicates that the checkpoint data stored in a storage region indicated by the target mapping data is valid. Therefore, the read/write request processing module can flip the value of the second flag bit, and send the cyphertext to a storage region indicated by the flipped second flag bit, that is, use the storage region indicated by the flipped second flag bit as the storage region corresponding to new working data and store the cyphertext. In this way, the cyphertext can be stored in another storage region outside the same storage region indicated by the first flag bit and the second flag bit before flipped, therefore avoiding the checkpoint data in the storage region indicated by the first flag bit and the second flag bit before flipped being overwritten, ensuring data consistency.

If the two flag bits are different, the read/write request processing module can directly send the cyphertext to a storage region indicated by the second flag bit (i.e., the storage region corresponding to the working data indicated by the mapping data), thereby ensuring that the unexpired checkpoint data is not overwritten. It should be noted that when the two flag bits mentioned above are different, the second flag bit does not need to be flipped.

When the memory controller receives a read request for the persistent memory sent by the processor, the read/write request processing module can calculate a storage address of the corresponding mapping data and the storage address of the counter data according to the memory address corresponding to the read request, and use these two storage addresses as indexes to access the mapping data cache and the counter cache respectively.

When the counter cache hits, the read/write request processing module can send the counter corresponding to the read request to an encryption engine to calculate the OTP required for decryption. When the counter cache misses (i.e., the counter data corresponding to the read request is not stored in the counter cache), the system reads the corresponding counter data from the persistent memory and then calculates the OTP.

When the mapping data cache hits, the read/write request processing module can read a second flag bit corresponding to the current read request in a second flag bitmap of the mapping data, and send the read request to a memory page indicated by the second flag bit to read cyphertext.

When the mapping data cache misses (i.e., the mapping data corresponding to the current read request is not stored in the mapping data cache), the read/write request processing module can first obtain the mapping data from the persistent memory, then read the cyphertext from the persistent memory based on the mapping data, and send the mapping data into the mapping data cache.

When OTP calculation is completed and cyphertext is obtained, the read/write request processing module can XOR the OTP and the cyphertext to decrypt the cyphertext to obtain the plaintext data corresponding to the read request, and then send the plaintext data to the processor to complete the memory read request.

In a submission process of checkpoint data, for each checkpoint interval, when the checkpoint interval ends, the processor stops executing an application and writes a modified cache line in the processor cache back to the persistent memory. A process for writing back data is the same as a process of a write request for persistent memory.

After all the dirty data (modified data) in the processor cache is written back to the persistent memory, the checkpoint committing module can respectively write the counter data in the counter cache, the mapping data in the mapping data cache and the processor status data back to the counter data storage region, mapping data storage region and checkpoint metadata storage region in the persistent memory.

In addition, the checkpoint committing module can increase the number of the current checkpoint interval of the system in the checkpoint metadata register to enter a next checkpoint interval. At the same time, the current undo log of the counter in the logging region can be discarded to empty the memory occupied, so that the memory occupied can be reused in the next period.

When the system is restarted due to a crash or a power outage, the data recovery module can read the undo log of the counter generated during the checkpoint interval when the system is crashed from a log region of the persistent memory, according to a correspondence relationship between a counter cache line and an original data page, determine a target storage address of the original data page modified during the checkpoint interval.

Based on a modified target storage address, the system accesses designated mapping data. The system compares the number of the checkpoint interval in the designated mapping data with the number of the checkpoint interval of the system in the checkpoint metadata in the persistent memory. When the number of the checkpoint interval in the designated mapping data is equal to the number of the checkpoint interval of the system, the data recovery module can update the second flag bit in the designated mapping data that has a different value from the first flag bit to the value of the first flag bit.

The system reads the number of the checkpoint interval at the time of the crash from the checkpoint metadata region in persistent memory, and sends the number to the checkpoint metadata register. Then, the checkpoint number is increased, and the data recovery operation continues to be performed in this checkpoint interval.

In order to avoid counter value reuse, for each counter recorded by undo log, the data recovery module reads the cyphertext related to that counter and first flag bit of the mapping data, and decrypts the cyphertext indicated by the first flag bit of the mapping data using the counter value in the undo log. Afterwards, the system reads the value of counter from the original memory region and increases the value until its 16th bit changes and then uses the new value to re-encrypt the data plaintext and update the counter value in the counter cache. At the same time, the system updates the mapping data according to the processing method of the memory write request, and writes the re-cyphertext back to the persistent memory.

Then the data recovery module refreshes the dirty data in the counter and mapping data cache back to the persistent memory, and recovers the processor status data in the checkpoint metadata region of the persistent memory to the register of the processer, increases the number of the checkpoint interval, completes data recovery, continues to execute the application in the processor, releases the memory space occupied by the counter's undo log for subsequent checkpoint intervals.

It should be noted that if the system crashes again in a process of data recovery, as the recovery operation is performed within a new checkpoint interval and no modifications are made to the committed checkpoint data, the recovery module only needs to perform the recovery operation again.

In addition, the data read request or the data write request in the present disclosure can be a read request or a write request generated by the processor in the execution of the graph application program for a read operation or a write operation of graph data. The data read/write request can also be a read request or a write request corresponding to other types of data, which is not limited in the present disclosure.

Figure 3:
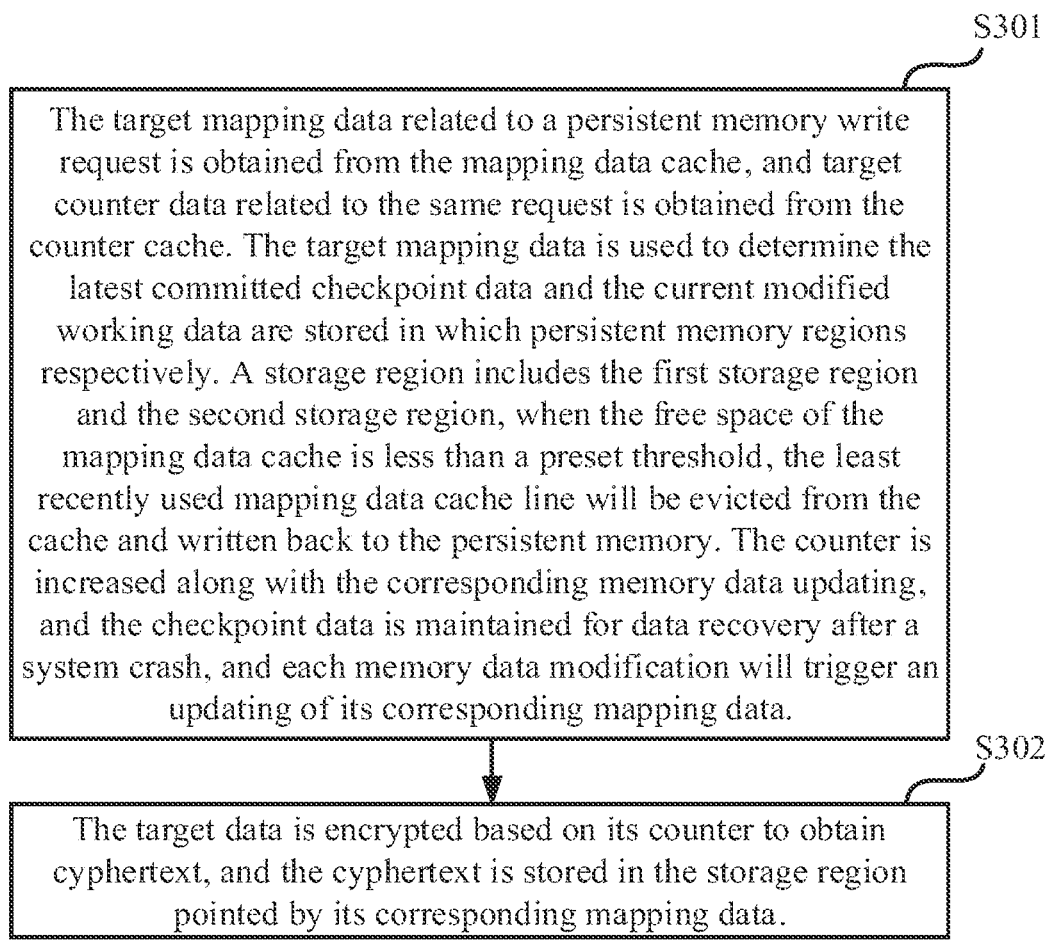
FIG. 3 is a schematic flowchart of a data storing method provided in the present disclosure.

The above is an explanation of a data storing system provided in the present disclosure, and accordingly, the present disclosure further provides a data storing method applied to the aforementioned data storing system, as shown in FIG. 3.

FIG. 3 is a schematic flowchart of a storing method provided in the present disclosure. The method is executed by a data processing module. The method includes following steps S301 and S302.

In step S301, the target mapping data related to a persistent memory write request is obtained from the mapping data cache, and target counter data related to the same request is obtained from the counter cache. The target mapping data is used to determine the latest committed checkpoint data and the current modified working data are stored in which persistent memory regions respectively. A storage region includes the first storage region and the second storage region, when the free space of the mapping data cache is less than a preset threshold, the least recently used mapping data cache line will be evicted from the cache and written back to the persistent memory. The counter is increased along with the corresponding memory data updating, and the checkpoint data is maintained for data recovery after a system crash, and each memory data modification will trigger an updating of its corresponding mapping data;

In step S302, the target data is encrypted based on its counter to obtain cyphertext, and the cyphertext is stored in the storage region pointed by its corresponding mapping data.

In the present disclosure, the executing entity for implementing the data storing method can be a processor. The executing entity can also be a data processing module of a data storing system. For ease of understanding, the present disclosure only takes the data processing module as the executing entity to explain a data storing method provided in the present disclosure.

In a process of processing data by a processor, it usually involves a read request to the memory or a write request to the memory. Taking reading data from the persistent memory or writing data to persistent memory as an example, in a process of writing data, in order to ensure data privacy, the data processing module can encrypt data based on a counter that increase in count as data updates. In this way, when data is read, data can be decrypted through a corresponding counter data to ensure data privacy.

In addition, in order to ensure data consistency after system restarts, in the present disclosure, in the data writing process, valid checkpoint data is stored in a different storage region from a storage region for the modified working data, so that data recovery can be performed based on the checkpoint data committed to the persistent memory after power outage and restart.

After obtaining a read request from memory, the data processing module can, based on the target memory address corresponding to the read request, obtain the target counter data and target mapping data corresponding to the read request; based on the target mapping data, determine the target storage region in the persistent memory corresponding to the data corresponding to the read request, and read cyphertext from the target storage region; and according to the target counter data, decrypt the cyphertext to obtain the decrypted data corresponding to the read request. For ease of understanding, the present disclosure provides a schematic diagram of the execution process of a read request for the persistent memory, as shown in FIG. 4.

Figure 4:
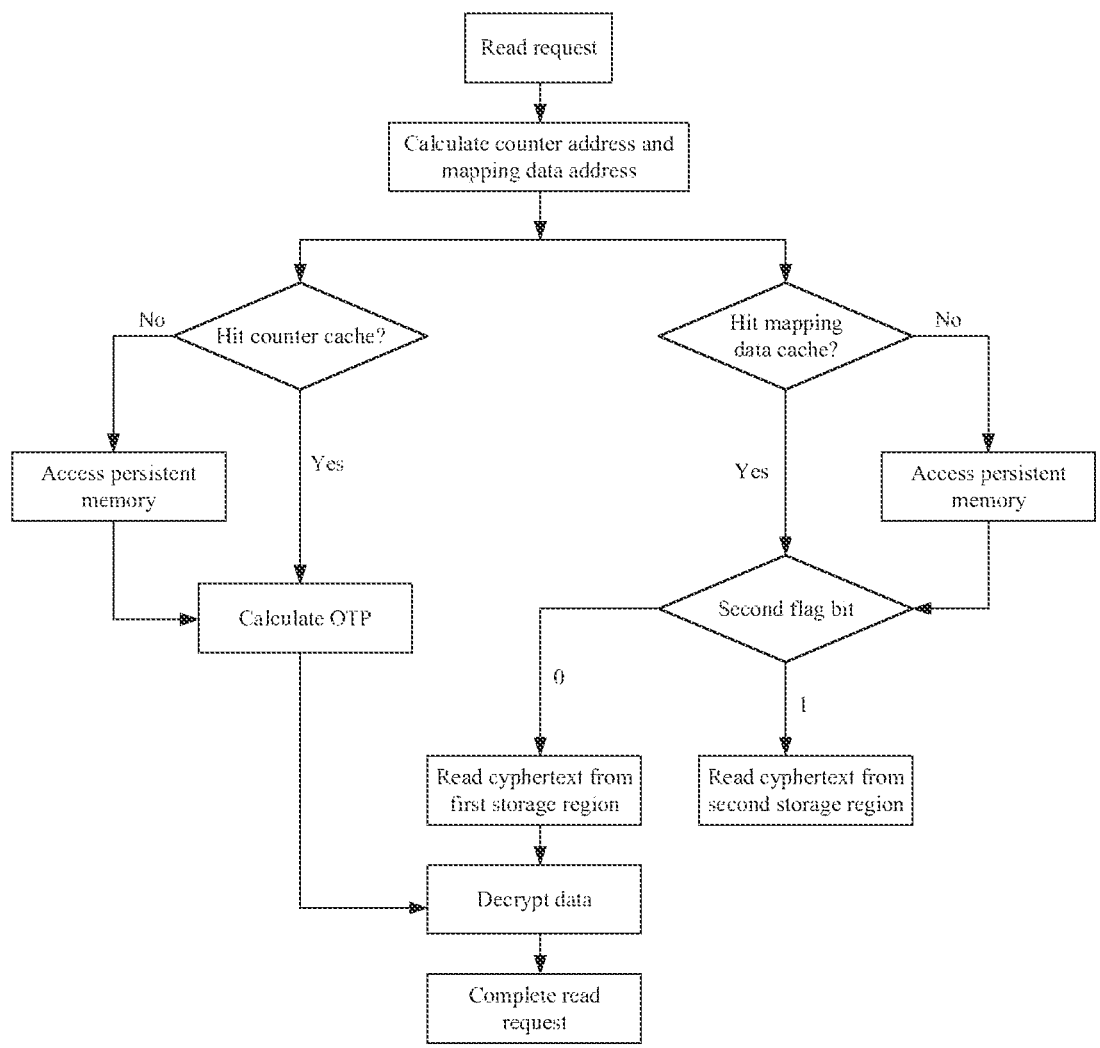
FIG. 4 is a schematic diagram of an execution process of a read request for a persistent memory provided in the present disclosure.

FIG. 4 is a schematic diagram of an execution process of a read request for a persistent memory provided in the present disclosure.

After obtaining a read request for the persistent memory, the data processing module can calculate a storage address of the corresponding mapping data and the storage address of the counter data according to the memory address corresponding to the read request, and use these two storage addresses as indexes to access the mapping data cache and the counter cache respectively.

When the counter cache hits, the data processing module can send the counter corresponding to the read request to an encryption engine to calculate the OTP required for decryption. When the counter cache misses, the processing module reads the corresponding counter data from the persistent memory and then calculates the OTP.

When the mapping data cache hits, the data processing module can read a second flag bit corresponding to the current read request in a second flag bitmap of the mapping data, and send the read request to a memory page indicated by the second flag bit to read cyphertext.

When the mapping data cache misses, the data processing module can first obtain the mapping data from the persistent memory, then read the cyphertext from the persistent memory based on the mapping data, and send the mapping data into the mapping data cache.

When OTP calculation is completed and cyphertext is obtained, the data processing module can XOR the OTP and the cyphertext to decrypt the cyphertext to obtain the plaintext data corresponding to the read request, and then send the plaintext data to the processor to complete the memory read request.

After obtaining a write request for the persistent memory, the data processing module can obtain, from the counter cache, target counter data corresponding to a write request; obtain, from the mapping data cache, target mapping data corresponding to the write request; according to the target counter data, encrypt the target data to obtain cyphertext, and store the cyphertext in a storage region corresponding to the working data.

In this process, if the target mapping data is not stored in the counter cache, the target mapping data needs to be obtained from the persistent memory. The data processing module can determine whether the number of the checkpoint interval corresponding to the target mapping data obtained from the persistent memory is less than the number of the current checkpoint interval. If so, the cyphertext is stored in the storage region corresponding to the checkpoint data, and the working data is used as the checkpoint data; otherwise, the cyphertext is stored in the storage region corresponding to the working data. For ease of understanding, the present disclosure provides a schematic diagram of the execution process of a write request, as shown in FIG. 5.

Figure 5:
FIG. 5 is a schematic diagram of an execution process of a write request for a persistent memory provided in the present disclosure.

FIG. 5 is a schematic diagram of an execution process of a write request for a persistent memory provided in the present disclosure.

When obtaining a write request for the persistent memory, the data processing module can access the counter cache and the mapping data cache at the same time. If both caches miss, the data processing module can obtain a target counter data and a target mapping data corresponding to the write request by accessing the persistent memory.

After the data processing module obtains the target counter data, if a dirty data flag bit of a corresponding counter cache line is not set (that is, the flag bit is 0), the data processing module can write the target counter data row into the undo log before the counter value is modified. The system determines an available logging region address based on the log metadata register, writes target counter data in an original counter cache line back into the logging region in persistent memory as a log entry, and sends a memory address of the counter cache line to a log header in the log metadata register. Then, the data processing module updates the counter value and the cache line tag, to obtain the updated counter data. If the 16th bit of the updated counter value jumps, the counter cache line is written back to the persistent memory.

The data processing module can compare the number of the current checkpoint interval of the system in the memory controller register with the number of the checkpoint interval in the target mapping data corresponding to the write request. If the number of the current checkpoint interval of the system is larger, the data processing module can set a value of a first flag bit in the target mapping data to a value of a second flag bit, and set the number of the checkpoint interval of the target mapping data to the number of the current checkpoint interval of the system. If the number of the checkpoint interval in the target mapping data is equal to the number of the current checkpoint interval of the system, there is no need to update the mapping data.

After encrypting the target data with the updated counter data to obtain the cyphertext and completing the update of the mapping data, the data processing module can read the first and second flag bits corresponding to the memory address of the memory write request from the target mapping data. If the two flag bits are the same, the data processing module can flip the second flag bit and send the cyphertext to the storage region indicated by the flipped second flag bit. If the two flag bits are different, the data processing module can directly send the cyphertext to the storage region indicated by the second flag bit.

The submission processing of checkpoints and the processing of data recovery have been explained in the description of the data storing system mentioned above, which are not repeated here.

It can be seen from the above method that the data storing system in the present disclosure can ensure the consistency and confidentiality of the graph data, and the mapping data cache can remove the colder mapping data in the application program running process, so that the checkpoint committing operation will not be carried out in advance due to insufficient mapping data cache space, reducing the additional memory read or write requests on the critical path for the system execution caused by redundant checkpoint committing operations, thus, further reducing the data persistence and encryption costs of the system, as well as system downtime.

In addition, the data storing system in the present disclosure maintains the consistency of counter data by using undo logs instead of shadow memory, ensuring that the latest value of counter data is located in the original memory region and can be accessed without the need for mapping data redirection, thus overlapping the processes of accessing counter memory and accessing mapping data memory, shortening the process of processing memory requests.

In the present disclosure, the data storing system includes a data cache module, a data processing module and a persistent memory. The persistent memory includes a first storage region and a second storage region. The data cache module includes a mapping data cache and a counter cache. The mapping data cache is configured to cache at least a part of mapping data. In addition, when there is no available mapping data cache space for newly generated mapping data, the least recently used mapping data is evicted from the mapping data cache and written to the persistent memory. The data processing module is configured to obtain target counter data and target mapping data, encrypt the target data based on the target counter data to obtain cyphertext, and store the cyphertext in a designated location in the persistent encryption memory based on the mapping data.

From the above data storing system and data storing method, it can be seen that the data cache module in the data storing system according to the present disclosure can, during a process for accessing the memory, evict least recently used mapping data from the mapping data cache, therefore ensuring sufficient storage space in the mapping data cache, avoiding redundant checkpoint committing operations.

In addition, the data storing system in the present disclosure can encrypt data through a counter, and store working data and checkpoint data through two storage regions, thus protecting data privacy while ensuring data consistency.

Figure 6:
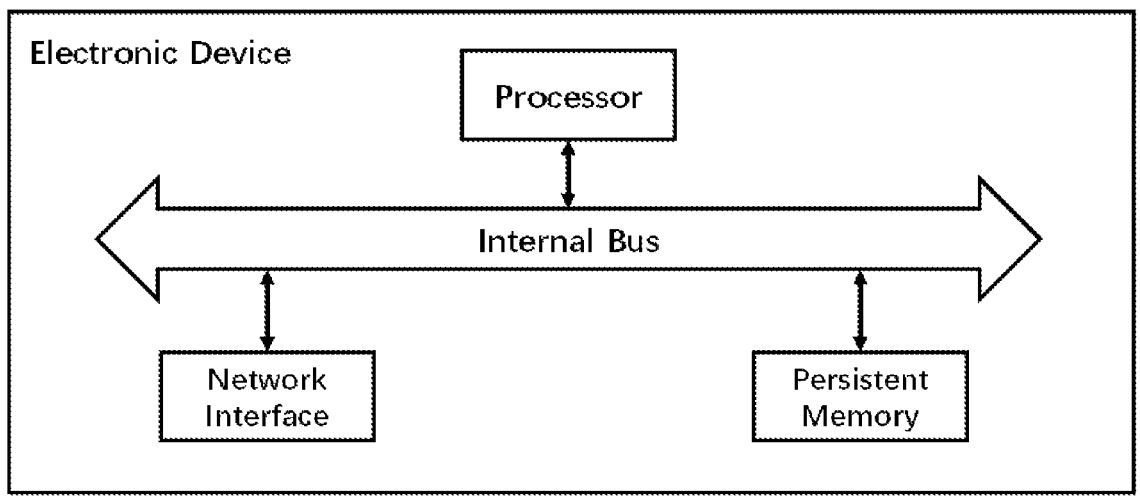
FIG. 6 is a schematic diagram of an electronic device corresponding to the system shown in FIG. 1 provided in the present disclosure.

The present disclosure further provides a schematic structural diagram of an electronic device corresponding to FIG. 3, as shown in FIG. 6. As shown in FIG. 6, at the hardware level, the electronic device includes a processor, an internal bus, a network interface, and a persistent memory (a non-volatile memory), and may include hardware required for other operations. The processor reads the corresponding computer program from the non-volatile memory, then runs the computer program, to implement the method for data storing described in FIG. 3 above. Of course, in addition to the software implementation, the present disclosure does not exclude other implementation methods, such as logic devices or a combination of hardware and software, etc. That is, the execution body of the following processing process is not limited to individual logic units, but can also be hardware or logic devices.

It was clear that improvements to a technology could be distinguished between hardware improvements (e.g., improvements to circuit structures such as diodes, transistors, switches, etc.) and software improvements (improvements to a method flow). However, with the development of technology, currently, the improvements of many method flows can be regarded as the direct improvements of the hardware circuit structures. Designers almost always get the corresponding hardware circuit structure by programming the improved method flow into the hardware circuit. Therefore, it cannot be said that a method flow improvement cannot be implemented with a hardware physical module. For example, a Programmable Logic Device (PLD) (e.g., Field Programmable Gate Array (FPGA)) is one such integrated circuit whose logic function is determined by user programming of the device. A digital system is "integrated" on a PLD by the designer's own programming, without the need for a chip manufacturer to design and manufacture a dedicated integrated circuit chip. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the most commonly used is Very-High-Speed Integrated Circuit Hardware Description Language (VHDL) and Verilog. It should also be clear to those skilled in the art that a hardware circuit implementing the logical method flow can be easily obtained by simply programming the method flow with a little logic in one of the above hardware description languages and programming the method flow into the integrated circuit.

The controller can be implemented in any suitable manner, for example, the controller can take the form of, for example, a microprocessor or processor and a computer readable medium storing computer readable program code (e.g., software or firmware) executable by the (micro)processor, logic gates, switches, Application Specific Integrated Circuit (ASIC), programmable logic controllers and embedded microcontrollers. Examples of the controllers may include, but are not limited to, the following microcontrollers: ARC 625D, Atmel AT91SAM, Microchip PIC18F26K20, and Silicone Labs C8051F320, and memory controllers may also be implemented as part of the control logic of the memory. It is also known to those skilled in the art that, in addition to implementing the controller in a purely computer readable program code manner, it is entirely possible to make the controller perform the same function in the form of logic gates, switches, specialized integrated circuits, programmable logic controllers, embedded microcontrollers, etc. by logically programming the method steps. Thus, such a controller can be considered as a hardware component, and the devices included therein for implementing various functions can also be considered as structures within the hardware component. Or even, the apparatus for implementing various functions can be considered as both a software module for implementing a method and a structure within a hardware component.

The systems, apparatuses, modules, or units elucidated in the above embodiments can be implemented specifically by a computer chip or entity, or by a product with certain functions. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above devices are divided into various units according to their functions and described respectively. It is, of course, possible to implement the functions of each unit in the same or multiple software and/or hardware when implementing the present disclosure.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects.

Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure is described with reference to flowcharts and/or block diagrams of methods, devices (systems), and computer program products according to embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data storing device to produce a machine such that instructions executed by the processor of the computer or other programmable data storing device produce an apparatus for implementing a function specified in one or more processes of the flowchart and/or one or more blocks of the block diagram.

These computer program instructions may also be stored in a computer-readable memory capable of directing the computer or other programmable data storing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may also be loaded onto a computer or other programmable data storing device such that a series of operational steps are executed on the computer or other programmable device to produce computer-implemented processing such that the instructions executed on the computer or other programmable device provide the steps used to perform the functions specified in one or more processes of the flowchart and/or one or more blocks of the block diagram.

In an exemplary configuration, the computing device includes one or more processors (CPUs), input/output interfaces, network interfaces, and memory.

Computer readable media include permanent and non-permanent, removable and non-removable media that can be implemented by any method or technology to store information. Information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read only memory (CDROM), digital versatile disc (DVD) or other optical storage, magnetic cartridge tape, magnetic tape magnetic disk storage, other magnetic storage device or any other non-transport medium that can be used to store information that can be accessed by a computing device. As defined herein, computer readable media does not include transitory computer readable media, such as modulated data signals and carriers.

It should also be noted that the term "comprise", "include" or any other variation thereof is intended to cover non-exclusive inclusion, such that a process, method, article, or device that includes a set of elements includes not only those elements, but also other elements that are not explicitly listed, or other elements that are inherent to such a process, method, commodity, or device. Without further limitation, the element defined by the statement "including a . . . " do not preclude the existence of additional identical elements in the process, method, article, or device that include the element.

It should be understood by those skilled in the art that embodiments of the present disclosure may be provided as methods, systems or computer program products. Accordingly, the present disclosure may take the form of an entirely hardware embodiment, an entirely software embodiment or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure may be described in the general context of computer-executable instructions executed by a computer, such as a program module. Generally, a program module includes routines, programs, objects, components, data structures, and the like that perform a specific task or implement a specific abstract data type. The present disclosure may also be practiced in distributed computing environments where tasks are performed by remote processing devices that are connected via a communication network. In distributed computing environments, program modules may be located in local and remote computer storage medium, including storage devices.

The various embodiments in the present disclosure are described in a progressive manner, and the same or similar parts between the various embodiments may be referred to each other, and each embodiment focuses on the differences from other embodiments. In particular, for a system embodiment, since it is basically similar to the method embodiment, the description is relatively simple, and for related parts, please refer to the partial description of the method embodiment.

The above description is only embodiments of the present disclosure and is not intended to limit the present disclosure. For those skilled in the art, various modifications and changes may be made in the present disclosure. Any modification, equivalent replacement, improvement, etc. present the spirit and principle of the present disclosure shall be included in the scope of the claims of the present disclosure.

What is claimed is:

1. A data storing system, comprising: a data cache module, a data processing module, and a persistent memory, wherein
the persistent memory comprises a first storage region and a second storage region, wherein the first storage region and the second storage region are configured to store checkpoint data committed at an end of a previous checkpoint interval and working data modified in a current checkpoint interval, wherein the checkpoint data is configured for data recovery after a system restart;
the data cache module comprises a mapping data cache and a counter cache, wherein the mapping data cache is configured to cache at least a part of mapping data; and in response to determining that a mapping data cache space is less than a preset threshold, remove least recently used mapping data from the mapping data cache, such that the least recently used mapping data is written back to the persistent memory; wherein the mapping data is configured to determine a storage region of the checkpoint data in the persistence memory and a storage region of the working data in the persistence memory, and the counter cache is configured to cache at least part of counter data, wherein a value of the counter data increases with an update of target data; and
the data processing module is configured to:
obtain, from the counter cache, target counter data corresponding to a write request to the persistent memory;
obtain, from the mapping data cache, target mapping data corresponding to the write request;
according to the target counter data, encrypt the updated working data to obtain cyphertext; and
according to the target mapping data, store the cyphertext in the storage region reserved for the working data, wherein each working data has its own mapping data.

2. The system according to claim 1, wherein the data processing module is further configured to:
in response to determining that the target mapping data is not stored in the mapping data cache, obtain the target mapping data from the persistent memory; and
after obtaining the write request, determine whether a number of a checkpoint interval corresponding to the target mapping data obtained from the persistent memory is less than a number of a current checkpoint interval,
in response to determining that the number of the checkpoint interval corresponding to the target mapping data obtained from the persistent memory is less than the number of the current checkpoint interval, store the cyphertext in a storage region corresponding to checkpoint data indicated by the target mapping data, and take the working data as the checkpoint data,
in response to determining that the number of the checkpoint interval corresponding to the target mapping data obtained from the persistent memory is equal to the number of a current checkpoint interval,
in response to determining that checkpoint data and work data indicated by the target mapping data are located in the same storage region, store the cyphertext in another storage region,
in response to determining that checkpoint data and working data indicated by the target mapping data are located in different storage regions, store the cyphertext in a storage region corresponding to working data indicated by the target mapping data.

3. The system according to claim 1, wherein the persistent memory further comprises a logging region, a checkpoint metadata storage region, a counter data storage region, and a mapping data storage region, wherein the logging region is configured to store an undo log for updated counter data.

4. The system according to claim 3, wherein the data processing module is configured to:
  when the checkpoint interval ends, suspend an application process, and write dirty cache lines in a processor cache back to the persistent memory with a process of memory write request, write the dirty cache lines in the mapping data cache and counter cache to the persistent memory, and write the processor status data back to the persistent memory; and
  increase the number of the current checkpoint interval and releases a space of a counter undo log in the persistent memory.

5. The system according to claim 3, wherein the data processing module is configured to:
  after receiving the write request, obtain counter data;
  according to a cache line tag corresponding to the counter data, determine whether the counter data changes in the current checkpoint interval,
    in response to determining that the counter data does not change in the current checkpoint interval, write the counter data into the undo log, write the undo log into the logging region in the persistent memory, and update the counter data and the cache line tag;
    in response to determining that the counter data changes in the current checkpoint interval, update the counter data; and
  according to updated counter data, encrypt the target data to obtain cyphertext.

6. The system according to claim 1, wherein the data cache module further comprises a log metadata register and a checkpoint metadata register, wherein
  the log metadata register is configured to:
    cache persistent memory addresses of counter data blocks, wherein the number of the addresses cached by the register is less than or equal to a determined threshold;
    in response to determining that the number of the cached memory addresses reaches the threshold, write content of the register to persistent memory with a memory write request; and
    cache the persistent memory address of the next unused undo log space; and
  the checkpoint metadata register is configured to:
    store a start address of the mapping data in persistent memory and the recently used part of the persistent memory space allocation bitmap, and
    store four flag bits respectively configured to indicate whether dirty processor cache lines, dirty counter cache lines, dirty mapping data cache lines and processor status are written back to persistent memory during checkpoint committing phase.

7. The system according to claim 1, wherein the target mapping data comprises a first flag bit and a second flag bit, wherein the first flag bit is configured to represent whether the checkpoint data is stored in the first storage region or the second storage region, and the second flag bit is configured to represent whether the working data is stored in the first storage region or the second storage region.

8. The system according to claim 7, wherein the data processing module is configured to:
  after receiving the write request, determine whether a number of the checkpoint interval corresponding to the target mapping data is less than a number of a current checkpoint interval,
    in response to determining that the number of the checkpoint interval corresponding to the target mapping data is less than the number of the current checkpoint interval, set a storage region indicated by the second flag bit in the target mapping data as a storage region indicated by the first flag bit in the target mapping data;
  update the number of the checkpoint interval corresponding to the target mapping data to the number of the current checkpoint interval; and
  determine whether the storage region indicated by the first flag bit in the target mapping data corresponding to the write request and the storage region indicated by the second flag bit in the target mapping data corresponding to the write request are same,
    in response to determining that the storage region indicated by the first flag bit in the target mapping data corresponding to the write request and the storage region indicated by the second flag bit in the target mapping data corresponding to the write request are different, store the cyphertext in the storage region indicated by the second flag bit;
    in response to determining that the storage region indicated by the first flag bit in the target mapping data corresponding to the write request and the storage region indicated by the second flag bit in the target mapping data corresponding to the write request are same, flip the second flag bit and store the cyphertext in a storage region indicated by the flipped second flag bit.

9. The system according to claim 7, wherein the data processing module is further configured to:
  obtain a read request for the persistent memory;
  according to a target memory address corresponding to the read request, obtain target counter data and target mapping data corresponding to the read request;
  according to the target mapping data, determine a storage region in the persistent memory indicated by the second flag bit as a target storage region, and read cyphertext from the target storage region; and
  according to the target counter data, decrypt the cyphertext to obtain decrypted data corresponding to the read request.

10. The system according to claim 7, wherein the data processing module is further configured to:
  after a system restart, read an undo log of the counter generated in a target checkpoint interval before the system restart from a logging region in the persistent memory;
  according to the undo log, determine an address of a first storage region in the persistent memory of working data in the target checkpoint interval;
  according to the address of the first storage region, obtain designated mapping data;
  determine whether a number of the checkpoint interval corresponding to the designated mapping data is the same as a number of a system checkpoint interval in a checkpoint metadata storage region of the persistent memory;
  in response to determining that the number of the checkpoint interval corresponding to the designated mapping data is the same as the number of the system checkpoint interval in the checkpoint metadata storage region of the persistent memory, update a value of a second flag bit in the designated mapping data that is different from a first flag bit in the designated mapping data to a value of the first flag bit in the designated mapping data;
  read a number of the checkpoint interval before the system restart from the persistent memory, send the number of the checkpoint interval before the system restart from the persistent memory to the checkpoint metadata register, increase a number of the checkpoint interval, and start data recovery;

based on a counter value in the undo log, decrypt the checkpoint data indicated by the first flag bit of the mapping data, re-encrypt the checkpoint plaintext with a new counter value and send a cyphertext to the persistent memory; and flush the modified counter cache lines and mapping data cache lines back to the persistent memory, send the processor status in checkpoint data to the processor registers, increase the number of checkpoint interval, complete data recovery, and continue to execute application.

11. The system according to claim 1, wherein the data processing module is configured to:

in response to determining that the target counter data is not stored in the counter cache and the target mapping data is not stored in the mapping data cache, obtain the target counter data and the target mapping data from the persistent memory.

12. The system according to claim 1, wherein the target data comprises graph data, and the data storing system is configured to read and write graph data involved in a graph calculation process.

13. A data storing method, applied to a data storing system, wherein the data storing system comprises a data cache module, a data processing module and a persistent memory, and the data cache module comprises a counter cache and a mapping data cache; wherein the method is executed by the data processing module, and comprises:

obtaining mapping data corresponding to a persistent memory write request from the mapping cache, and obtaining counter data corresponding to the write request from the counter cache, wherein the persistent memory comprises the first storage region and the second storage region, which are configured to store latest checkpoint data and working data modified in current checkpoint interval, the mapping data is configured to determine which storage region the checkpoint data and modified working data are stored, and in response to determining that a free space of the mapping data cache is less than a preset threshold, the least recently used mapping data cache line is written back to the persistent memory from mapping data cache, wherein a counter is increased when its corresponding data block is updated, and the checkpoint data is configured for system recovery, wherein each modified persistent memory data block has its corresponding mapping data; and according to the target counter data, encrypting the target data to obtain cyphertext, and according to the target mapping data, storing the cyphertext in a storage region corresponding to the working data.

14. The method according to claim 13, wherein the method further comprises:

in response to determining that the target mapping data is not stored in the mapping data cache, obtaining the target mapping data from the persistent memory; and after obtaining the write request, determining whether a number of a checkpoint interval corresponding to the target mapping data obtained from the persistent memory is less than a number of the current checkpoint interval, in response to determining that the number of the checkpoint interval corresponding to the target mapping data obtained from the persistent memory is less than the number of the current checkpoint interval, storing the cyphertext in a storage region corresponding to checkpoint data indicated by the target mapping data, and taking the working data as the checkpoint data;

in response to determining that the number of the checkpoint interval corresponding to the target mapping data obtained from the persistent memory is equal to the number of the current checkpoint interval, in response to determining that checkpoint data and working data indicated by the target mapping data are located in a same storage region, storing the cyphertext in another storage region than the storage region of the checkpoint data and the working data indicated by the target mapping data, in response to determining that checkpoint data and working data indicated by the target mapping data are located in different storage regions, storing the cyphertext in a storage region corresponding to working data indicated by the target mapping data.

15. The method according to claim 13, wherein the persistent memory further comprises a logging region, a checkpoint metadata storage region, a counter data storage region, and a mapping data storage region, wherein the logging region is configured to store a undo log corresponding to the counter data.

16. The method according to claim 15, wherein the method further comprises: when the checkpoint interval ends, suspending an application process, writing dirty cache lines in the processor cache back to the persistent memory with a process of memory write request, and writing dirty cache lines in the mapping data cache and counter cache to the persistent memory, and writing the processor status data back to the persistent memory; and increasing the number of the current checkpoint interval and releasing a space of a counter undo log in the persistent memory; or according to the target counter data, encrypting the target data to obtain cyphertext comprising: after receiving the write request, obtaining counter data; according to a cache line tag corresponding to the counter data, determining whether the counter data changes in the current checkpoint interval, in response to determining that the counter data does not change in the current checkpoint interval, writing the counter data into the undo log, writing the undo log into the logging region in the persistent memory, and updating the counter data and the cache line tag; in response to determining that the counter data changes in the current checkpoint interval, updating the counter data; and according to updated counter data, encrypting the target data to obtain cyphertext.

17. The method according to claim 13, wherein the data cache module further comprises a log metadata register and a checkpoint metadata register, wherein the log metadata register is configured to cache persistent memory addresses of counter data blocks, wherein the number of the addresses cached by the register is less than or equal to a determined threshold; and in response to determining that the number of the cached memory addresses reaches the threshold, write content of the register to persistent memory with a memory write request; and cache the persistent memory address of the next unused undo log entry block; and the checkpoint metadata register is configured to store a start address of the mapping data in persistent memory and the recently used part of the persistent memory space allocation bitmap, and store four flag bits respectively configured to indicate whether dirty processor cache lines, dirty counter cache lines, dirty mapping data cache lines and processor status are written back to persistent memory during checkpoint committing phase.

18. The method according to claim 13, wherein the target mapping data comprises a first flag bit and a second flag bit, wherein the first flag bit is configured to represent whether the checkpoint data is stored in the first storage region or the second storage region, and the second flag bit is configured to represent whether the working data is stored in the first storage region or the second storage region; and the method further comprises: after receiving the write request, determining whether a number of the checkpoint interval corresponding to the target mapping data is less than a number of the current checkpoint interval; in response to determining that the number of the checkpoint interval corresponding to the target mapping data is less than the number of the current checkpoint interval, setting a storage region indicated by the second flag bit in the target mapping data as a storage region indicated by the first flag bit in the target mapping data; updating the number of the checkpoint interval corresponding to the target mapping data to the number of the current checkpoint interval; and determining whether the storage region indicated by the first flag bit in the target mapping data corresponding to the write request and the storage region indicated by the second flag bit in the target mapping data corresponding to the write request are same; in response to determining that the storage region indicated by the first flag bit in the target mapping data corresponding to the write request and the storage region indicated by the second flag bit in the target mapping data corresponding to the write request are different, storing the cyphertext in the storage region indicated by the second flag bit; in response to determining that the storage region indicated by the first flag bit in the target mapping data corresponding to the write request and the storage region indicated by the second flag bit in the target mapping data corresponding to the write request are same, flipping the second flag bit and storing the cyphertext in a storage region indicated by the flipped second flag bit; or the method further comprises: obtaining a read request for the persistent memory; according to a target memory address corresponding to the read request, obtaining target counter data and target mapping data corresponding to the read request; according to the target mapping data, determining a storage region in the persistent memory indicated by the second flag bit as a target storage region, and reading cyphertext from the target storage region; and according to the target counter data, decrypting the cyphertext to obtain decrypted data corresponding to the read request; or the method further comprises: after a system restart, reading an undo log of the counter generated in a target checkpoint interval before the system restart from a logging region in the persistent memory; according to the undo log, determining an address of a first storage region in the persistent memory of working data in the target checkpoint interval; according to the address of the first storage region, obtaining designated mapping data, determining whether a number of the checkpoint interval corresponding to the designated mapping data is the same as a number of a system checkpoint interval in a checkpoint metadata storage region of the persistent memory; in response to determining that the number of the checkpoint interval corresponding to the designated mapping data is the same as the number of the system checkpoint interval in the checkpoint metadata storage region of the persistent memory, updating a value of the second flag bit in the designated mapping data that is different from the first flag bit to a value of the first flag bit; reading a number of the checkpoint interval before the system restart from the persistent memory, sending the number of the checkpoint interval before the system restart from the persistent memory to the checkpoint metadata register, increasing a number of the checkpoint interval, and starting data recovery; based on a counter value in the undo log, decrypting the checkpoint data indicated by the first flag bit of the mapping data, re-encrypting the checkpoint plaintext with a new counter value and sending the cyphertext to the persistent memory; and flushing the modified counter cache lines and mapping data cache lines back to the persistent memory, sending the processor status in checkpoint data to the processor registers, increasing the number of checkpoint interval, completing data recovery, and continuing to execute application.

19. The method according to claim 13, wherein
according to the target counter data, encrypting the target data to obtain cyphertext, and according to the target mapping data, storing the cyphertext in the storage region corresponding to the working data comprising: in response to determining that the target counter data is not stored in the counter cache and the target mapping data is not stored in the mapping data cache, accessing the persistent memory, and obtaining the target counter data and the target mapping data from the persistent memory; or
the target data comprises graph data, and the data storing system is configured to read and write graph data involved in a graph calculation process.

20. An electronic device comprising a memory, a processor and a computer program stored on the memory and runnable on the processor, wherein the processor, when the program is executed by the processor, achieves the method according to claim 13.

* * * * *